United States Patent
John et al.

(10) Patent No.: US 10,235,455 B2
(45) Date of Patent: Mar. 19, 2019

(54) SEMANTIC SEARCH SYSTEM INTERFACE AND METHOD

(71) Applicant: Innography, Inc., Austin, TX (US)

(72) Inventors: Roji John, Austin, TX (US); Carl L. Steiger, Jr., Austin, TX (US); Clifford Scott Herrick, Austin, TX (US); David Martin Fisher, Austin, TX (US); Paul Spencer Liechty, Austin, TX (US)

(73) Assignee: Innography, Inc., Austin, TX (US)

( * ) Notice: Subject to any disclaimer, the term of this patent is extended or adjusted under 35 U.S.C. 154(b) by 57 days.

(21) Appl. No.: 13/956,248

(22) Filed: Jul. 31, 2013

(65) Prior Publication Data

US 2015/0039581 A1 Feb. 5, 2015

(51) Int. Cl.
*G06F 17/30* (2006.01)

(52) U.S. Cl.
CPC .............................. *G06F 17/30722* (2013.01)

(58) Field of Classification Search
CPC ................................................ G06F 17/30722
See application file for complete search history.

(56) References Cited

U.S. PATENT DOCUMENTS

| | | | | |
|---|---|---|---|---|
| 6,968,332 | B1* | 11/2005 | Milic-Frayling et al. | 707/723 |
| 8,489,627 | B1* | 7/2013 | Brandt | 707/765 |
| 2005/0222980 | A1* | 10/2005 | Lee | 707/3 |
| 2007/0294200 | A1* | 12/2007 | Au | 706/55 |
| 2008/0189268 | A1* | 8/2008 | Au | 707/5 |
| 2008/0243786 | A1* | 10/2008 | Stading | G06F 17/30011 |
| 2008/0243799 | A1* | 10/2008 | Rozich | G06F 17/30864 |
| 2009/0171941 | A1* | 7/2009 | Stern | G06F 17/30867 |
| 2009/0210383 | A1* | 8/2009 | Seemann | 707/3 |
| 2010/0036829 | A1* | 2/2010 | Leyba | G06F 17/30684 707/739 |
| 2010/0251145 | A1* | 9/2010 | Leppert | G06F 17/30991 715/762 |
| 2010/0306206 | A1* | 12/2010 | Brassil et al. | 707/754 |
| 2010/0312782 | A1* | 12/2010 | Li et al. | 707/769 |
| 2011/0040766 | A1* | 2/2011 | Robinson et al. | 707/749 |
| 2011/0058660 | A1* | 3/2011 | Piratla et al. | 379/134 |
| 2011/0078127 | A1* | 3/2011 | Lin et al. | 707/706 |
| 2011/0078187 | A1* | 3/2011 | Lim et al. | 707/772 |
| 2011/0276581 | A1* | 11/2011 | Zelevinsky | 707/766 |

(Continued)

OTHER PUBLICATIONS

Huanhuan Cao et al., "Context-Aware Query Classification", Jul. 19, 2009, pp. 1-8.*

(Continued)

*Primary Examiner* — Jared M Bibbee
(74) *Attorney, Agent, or Firm* — Cesari & Reed LLP; R. Michael Reed

(57) ABSTRACT

A method for semantic searching includes receiving a user input including seed data and a semantic input at a search system. The method further includes automatically generating a filter set based on the user input, where the filter set including a plurality of documents that correspond to the seed data, and includes providing the filter set and the semantic input to a semantic search engine. The method also includes receiving a set of semantic search results from the semantic search engine based on the filter set and the semantic input. The set of semantic search results corresponds to a sub-set of the filter set that is semantically similar to the semantic input.

19 Claims, 6 Drawing Sheets

(56) References Cited

U.S. PATENT DOCUMENTS

| | | | |
|---|---|---|---|
| 2013/0031076 A1* | 1/2013 | Bhola | G06F 17/3066 707/706 |
| 2013/0144870 A1* | 6/2013 | Gupta et al. | 707/726 |
| 2014/0172821 A1* | 6/2014 | Hu et al. | 707/711 |
| 2015/0026152 A1* | 1/2015 | Singh et al. | 707/710 |

OTHER PUBLICATIONS

Yueqin Hang et al., "Context Information Extraction of the Query Based on Single Document", 2004, IEEE, pp. 1-4.*
Ryen W. White et al., "Predicting User Interests from Contextual Information", Jul. 19, 2009, pp. 1-8.*
Lipyeow Lim et al., "Semantic Queries by Example", Mar. 18, 2013, pp. 1-12.*
Jing Bai et al., "Using Query Contexts in Information Retrieval", Jul. 23, 2007, pp. 1-8.*

* cited by examiner

SEMANTIC SEARCH SYSTEM INTERFACE AND METHOD

FIELD

The present disclosure is generally related to semantic search systems, and more particularly to semantic search systems configured to perform a semantic search on a limited set of documents from a document space based on a user input.

BACKGROUND

The Internet is a system of interconnected computer networks that use a standard TCP/IP (Transfer Control Protocol/Internet Protocol) suite to provide access to an extensive range of information resources and services. Such information resources may include images, audio data, video data, and document data, including inter-linked hypertext documents. Unless a user already knows how to access a document direction, the user may utilize a search engine to access the desired information.

Conventionally, search engines may utilize key word search logic to search and retrieve data from pre-processed data, retrieved by web crawling applications and indexed into one or more databases. However, keyword searching, including query expansion techniques, provides a set of search results related to the key words supplied by the user, but such results may not represent the results for which the user was searching.

Semantic searching attempts to improve search accuracy by taking into account both user context and assumptions about the underlying meaning of data in the data space in order to return search results that are relevant to the user's search. Semantic Search technologies may employ various semantic search methodologies, including, but not limited to, resource description framework (RDF) traversal, keyword-to-concept mapping, graph patters, logical inferences, and fuzzy logic for searching. However, semantic searching of a large document space may be resource intensive.

SUMMARY

In an embodiment, a method for semantic searching includes receiving a user input including seed data and a semantic input at a search system. The method further includes automatically generating a filter set based on the user input, where the filter set including a plurality of documents that correspond to the seed data, and includes providing the filter set and the semantic input to a semantic search engine. The method also includes receiving a set of semantic search results from the semantic search engine based on the filter set and the semantic input. The set of semantic search results corresponds to a sub-set of the filter set that is semantically similar to the semantic input.

In another embodiment, a search system includes a network interface configured to communicate with a remote device through a network, a processor coupled to the network interface, and a memory coupled to the processor. The memory is configured to store instructions that, when executed, cause the processor to receive a user input including seed data, a search attribute, and a semantic input, and automatically generate a filter set based on the search attribute and the seed data. The instructions further cause the processor to provide the filter set and the semantic input to a semantic search engine, and receive search results from the semantic search engine that correspond to the filter set and that are semantically similar to the semantic input.

In still another embodiment, a search system includes a semantic search engine configured to search a document space based on a semantic input to identify semantic search results having a semantic similarity to the semantic input. The search system further includes a search interface coupled to the semantic search engine. The search interface is configured to receive a user input including seed data, a search attribute, and a semantic input. The search interface is configured to retrieve a set of data based on the seed data using the search attribute and to automatically generate a filter set based on the set of data. The search interface is configured to provide the filter set and the semantic input to the semantic search engine and to receive the semantic search results limited to the filter set from the semantic search engine.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a search system are described below that provide semantic search functionality for searching a selected portion of a data space for documents that are semantically similar to a user input. In an embodiment, the search system provides an interface to receive a user input including a semantic input and including a user-selection of a particular data attribute category or data set selection together with a corresponding data input. The search system searches a data space using the data input to retrieve a set of documents. The search system then provides the semantic input and the set of documents to a semantic search engine for semantic searching within the set of documents to identify a semantic search results that are semantically similar to the semantic input. In an example, the semantic input may include one or more sentences describing a particular apparatus or method, and the semantic search engine may process the semantic input to determine a context and meaning in order to identify semantically similar (or relevant) documents within the set of documents. One possible example of a search system configured to provide semantic searching is described below with respect to FIG. 1.

Figure 1:
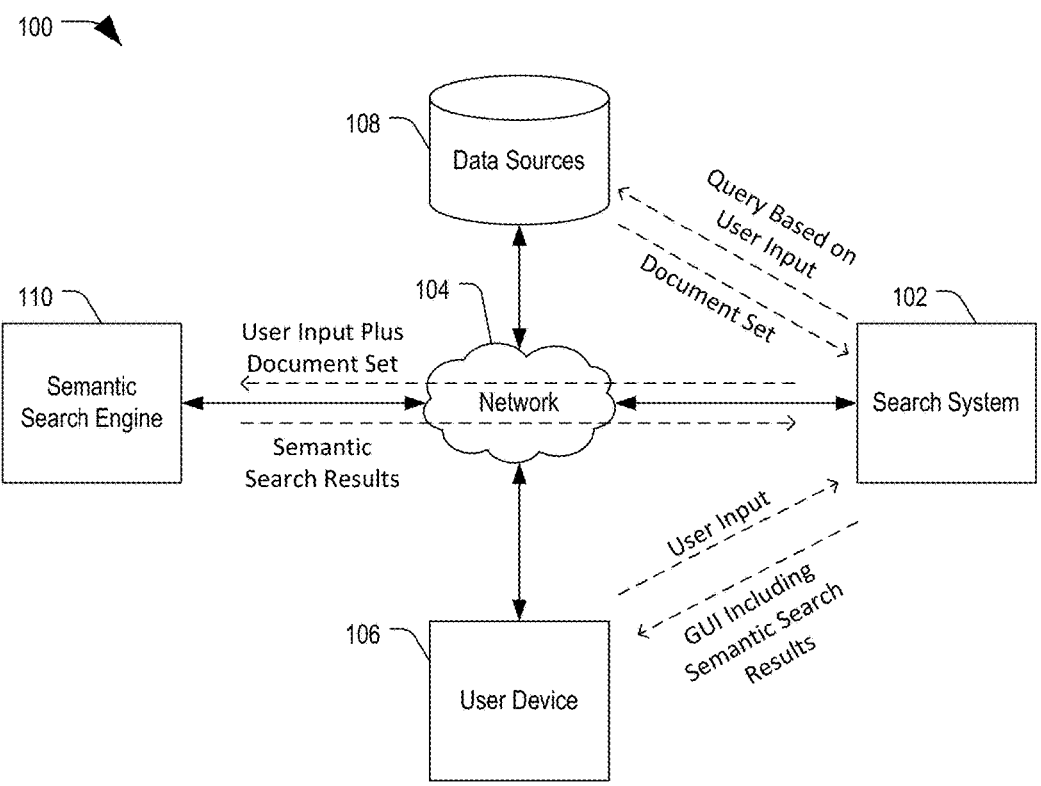
FIG. 1 is a block diagram of a semantic search system configured to provide semantic searching according to an embodiment.

FIG. 1 is a block diagram of a semantic search system 100 configured to provide semantic searching according to an embodiment. Semantic search system 100 includes a search system 102 couple to a user device 106 through a network 104, such as the Internet. Semantic search system 100 further includes one or more data sources 108 accessible to search system 102 through network 104, and includes a semantic search engine 110 coupled to network 104. Semantic search engine 110 is configured to process text data and to execute a semantic search on a set of documents, such as all of the documents in one or more data sources 108 or a subset of such documents, to identify semantically related or relevant documents and to return the search results to the requesting device.

As used herein, the term "semantic search" refers to a search performed based on an automated understanding of the searcher's intent and the contextual meaning of terms as they appear in the semantic input as well as in the searchable data space, whether on the World-Wide Web or in a pre-processed data base. Semantic search engine 110 may consider a search context, intent of the search, word variations, synonyms, a type of query (e.g., generalized query, specific query, specialized query, etc.), concept matching, natural language analysis, user data, or any combination thereof, to provide relevant search results. Search system 110 may be configured to disambiguate terms based on the context of the semantic input to form a semantic understanding.

In an embodiment, search system 102 may provide a user interface to user device 106 through network 104. User device 106 may be a computing device, such as a personal computer, laptop computer, tablet computer, smart phone, or other computing device capable of rendering an Internet browser application and communicating with network 104. The user interface may include user-selectable tabs, buttons, click-links, pull-down menus, and text inputs for receiving user data and user selections and for submitting a user input including such data and selections to search system 102. The user may interact with the user interface through user device 106 to select a tab, one or more click-links, pull-down menus, text inputs, and so on, to provide user input. The user may also interact with one of the text fields to provide a semantic input and then may select a "submit" or "search" button to initiate the search, causing user device 106 to send the user input (including the user selections and the semantic input) to search system 102 through network 104. In some examples, the user input may include seed data, such as a list of identifiers associated with documents, a company name, a date range, a revenue range or threshold (such as revenue associated with a company or product), a number of employees, an industry code (such as a North American Industry Classification System (NAICS) code, a Standard Industrial Classification (SIC) code, or other industry identifier), or any combination thereof.

Search system 102 receives the user input, generates a query based on the user input, and searches one or more data sources 108 to retrieve a document set corresponding to at least a portion of the user input (such as the seed data). In one example, the user input includes a company name, a user-selection of a radio button corresponding to a pre-defined search category for companies, and a semantic input. In another example, the user input includes seed data including a revenue range and/or an industry code as well as the semantic input. Search system 102 extracts at least the seed data from the user input (such as the company name) and performs a search of one or more data sources 108 based on the extracted data. In an example, one or more data sources 108 may include data that is pre-processed into one or more categories. For example, one or more data sources 108 may include a company attribute or field into which various documents are coded or stored. Search system 102 retrieves a document set corresponding to the extracted data. Search system 102 may then provide the user input (semantic input) and document set to semantic search engine 110.

Semantic search engine 110 may analyze the semantic input to determine a context and to disambiguate various terms and then may perform a semantic search on the set of documents based on the semantic input. The semantic search may include one or more queries automatically generated from the semantic input. Semantic search engine 110 may search one or more data sources 108 to retrieve documents that are semantically similar to the semantic input and may return the semantic search results to search system 102.

Search system 102 may further process the semantic search results, for example, by correlating related data to the semantic search results, and may generate a graphical user interface (GUI) through which the semantic search results may be reviewed and accessed. Search system 102 may then provide the GUI to user device 106.

In an example, search system 102 may retrieve data related to companies and individuals named within the semantic search results and may correlate (combine and relate) the retrieved data to the semantic search results to provide an output set of search results, which may be included in the GUI. The user may interact with the GUI to view the search results in a variety of ways, including as a heat chart, graphical map, geographic map, document list, and so on.

In the above-example, search system 102 limits the data space to a set of documents, allowing semantic search engine 110 to perform a semantic search over a subset of the document space rather than across all documents. As a result, semantic search engine 110 can perform a thorough semantic search of the set of documents in a much shorter amount of time than if such processing were applied across the entire document space. Accordingly, semantic search system 100 may perform targeted semantic searches quickly, allowing a searcher to identify a set of semantically relevant search results in a short amount of time.

While the above-example shows semantic search engine 110 as being separate from search system 102, it is possible to implement the semantic search engine 110 as a component within search system 102. One possible example search system 102 including semantic search engine 110 is described below with respect to FIG. 2.

Figure 2:
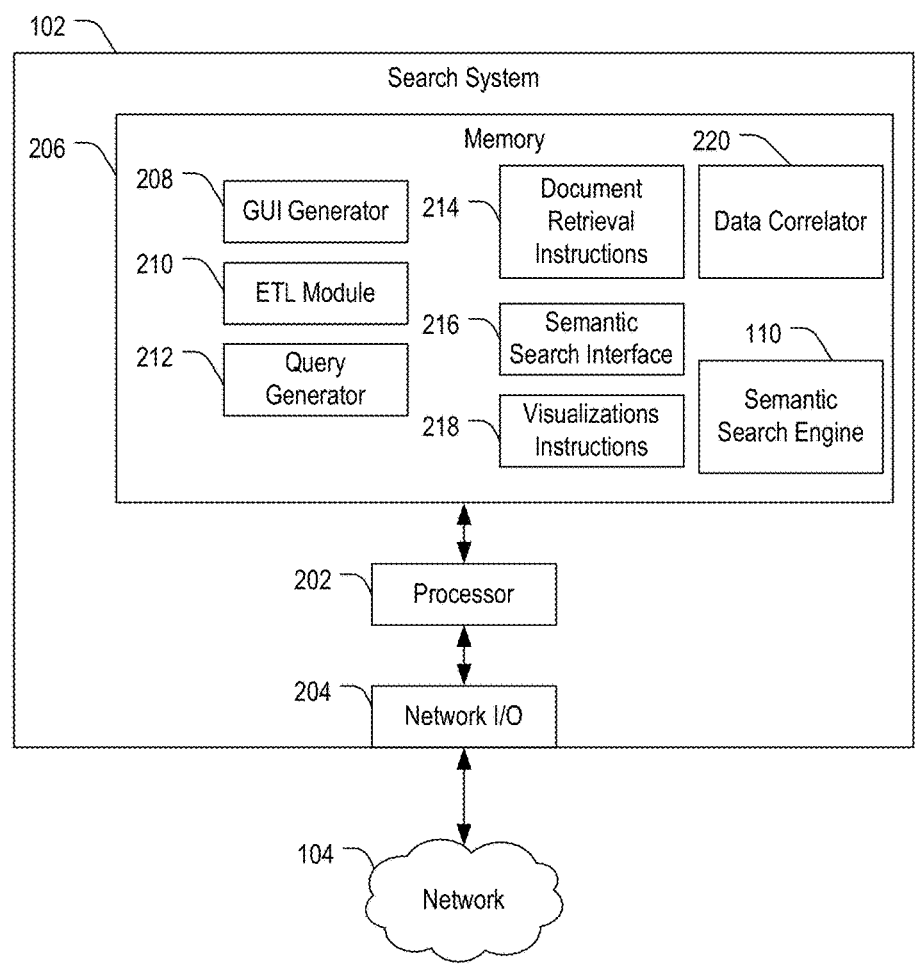
FIG. 2 is a block diagram of a semantic search system configured to provide semantic searching according to a second embodiment.

FIG. 2 is a block diagram of a semantic search system 200 configured to provide semantic searching according to a second embodiment. Semantic search system 200 includes search system 102, which has a network input/output (I/O) configured to couple to network 106. Search system 102 further includes a processor 202 coupled to network I/O 204 and to a memory 206. Memory 206 is configured to store data and instructions that, when executed, cause processor 202 to communicate with user device 106, one or more data sources 108, and optionally semantic search system 110 (shown in FIG. 1).

Memory 206 includes a GUI generator 208 that, when executed, causes processor 202 to generate a user interface including user-selectable options and/or search results to user device 106. GUI generator 208 may generate a user interface that can be rendered within an Internet browser application executing on user device 106. Memory 206 further includes an extract-transform-load (ETL) module 210 configured to extract and load portions of the user input received from user device 106. For example, ETL module 210 may cause processor 202 to extract seed data and user-selections from the user input and to extract semantic input. Memory 206 also includes a query generator 212 configured to generate one or more queries from the extracted user input. In an example, the query generator 212 causes processor 202 to generate queries corresponding to the seed data and user selections. Memory 206 also includes document retrieval instructions 214 that, when executed, causes processor 202 to retrieve a set of data from one or more data sources 108 using the one or more queries. The set of data may include a list of document identifiers, a set of documents, a list of data sources, or any combination thereof.

Memory 206 also includes a data correlator 220 that, when executed, may determine relationships between the set of documents and/or between documents of the set of documents and one or more other data sources. In an example, in response to receiving the set of data, ETL module 210 may cause processor to extract attributes from the data, query generator 212 may generate one or more queries based on the extracted attributes, and document retrieval instructions 214 may cause processor to retrieve ancillary documents and data based on the one or more queries. Data correlator 220 may cause processor 202 to process the ancillary data and to map the ancillary data to the set of documents.

Memory 206 further includes semantic search interface instructions 216 that, when executed, causes processor 202 to communicate the set of data and semantic input data extracted from the user input to semantic search engine 110. Semantic search engine 110 may be a separate server or apparatus (as depicted in FIG. 1) or may be an application stored in memory 206 (as shown in FIG. 2) that, when executed, causes processor 202 to process the semantic input to determine the context and meaning of the semantic terms and to perform a semantic search on the set of data. Semantic search engine 110 retrieves a set of semantic search results that are semantically similar to the semantic input from the user.

GUI generator 208 may cause processor 202 to produce a GUI including the semantic search results and ancillary data, which may be retrieved and correlated to the search results either before or after semantic searching. Search system 102 may transmit the GUI with the search results to user device 106 through network 104.

In general, search system 102 may be configured to receive user input as a text string, an imported document, and/or data values corresponding to check boxes, radio buttons, pull-down menus and other user-selectable elements. One possible example of a GUI configured to receive user input is described below with respect to FIG. 3.

Figure 3:
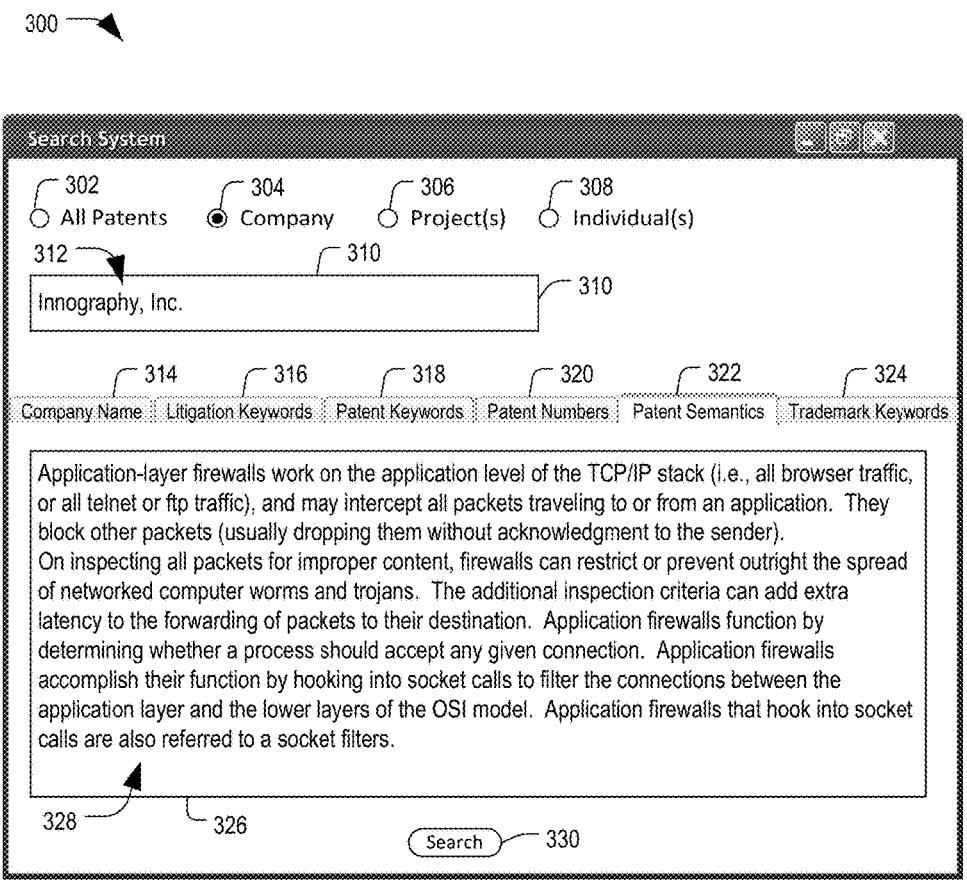
FIG. 3 is a diagram of a graphical user interface provided by a semantic search system according to an embodiment.

FIG. 3 is a diagram of a GUI 300 provided by a semantic search system 100 according to an embodiment. GUI 300 includes radio buttons 302, 304, 306, and 308, which are associated with attributes upon which search system 102 may limit its search. Radio button 302 is labeled "All Patents", and selection of which limits the search results to patent documents within the document space. Radio button 304 is labeled "Company", and selection of which causes search system 102 to search a company attribute of one or more data sources for the value of a text string 312 supplied within text field 310. In the illustrated example, text string 312 includes the company name "Innography, Inc." Radio button 308 labeled "Individuals" causes search system 102 to search individual names (such as inventors) using name data provided in text field 310. Radio button 306 labeled "Project(s)" allows a user to select one or more pre-defined sets of documents and/or to upload a document including a list of document identifiers (as discussed below with respect to FIG. 4).

GUI 300 further includes user-selectable tabs 314, 316, 318, 320, 322, and 324. Tab 314 is labeled "Company Name" and the user may select the tab to search companies. Tab 316 (labeled "Litigation Keywords") and the user may select tab 316 to search litigation. Tab 318 (labeled "Patent Keyword") is accessible by a user to perform keyword searches of patent documents. Tab 320 (labeled "Patent Numbers") is accessible by a user to search on patent numbers. Tab 322 (labeled "Patent Semantics") is accessible by a user to perform a semantic search. Tab 324 (labeled "Trademark Keywords") is accessible by a user to search trademarks. In the illustrated example, Tab 322 is selected, and GUI 300 includes a semantic text input field 326 with a semantic input 328. GUI 300 further includes a search button 330 that may be selected by the user to submit the user input.

By selecting radio button 304, entering "Innography, Inc." in text box 310, typing the semantic input 328 in semantic text input filed 326, and selecting submit button 330, the user initiates a semantic search by transmitting user input to search system 102. Search system 102 may search one or more data sources 108 based on a company attribute (corresponding to radio button 304) and using text string 312 (seed data) to retrieve a set of documents (an initial document set). Search system 102 may then provide the set of documents and the semantic input 328 to semantic search engine 110, which may perform a semantic search operation on the set of documents and provide semantic search results to search system 102. Search system 102 may combine the semantic search results with ancillary data and may provide a GUI including the semantic search results (and optionally the ancillary data) to the remote device associated with the user.

While it is possible to enter a keyword or search term for generation of the set of search results that provides a reduced document space on which to perform the semantic searching operation, the GUI may also include an option to select a pre-defined set of documents or to upload a document that includes a list of document identifiers. One possible example of such a GUI is described below with respect to FIG. 4.

Figure 4:
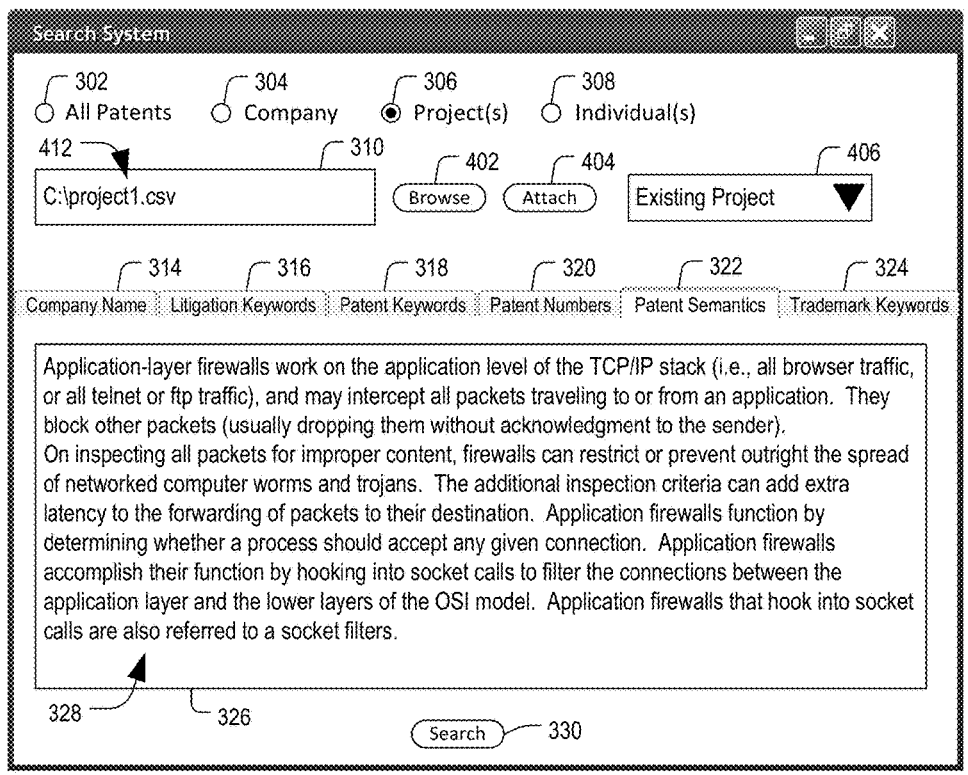
FIG. 4 is a diagram of a graphical user interface provided by a semantic search system according to a second embodiment.

FIG. 4 is a diagram of a GUI 400 provided by a semantic search system according to a second embodiment. GUI 400 includes all of the elements of FIG. 3. GUI 400 also includes a browse button 402 accessible by the user to browse for a file, and an attach button 404 accessible by the user to attach the file, which attachment may be represented by file path 412 (in this example "C:\project1.csv") in text field 310. Further, GUI 400 includes a pull-down menu 406, which may include a list of previously retrieved sets of documents within which the user may wish to perform the semantic search.

In this example, the user may select a project from pull-down menu 406 or may browse and upload a file to provide a list of document identifiers. In either case, search system 102 may retrieve the set of documents corresponding to the user input and provide the set of documents together with the semantic input 328 to semantic search engine 110.

It should be appreciated that the embodiments illustrated in FIGS. 3 and 4 are illustrative only and are not intended to be limiting. Other arrangements of input elements and other selectable components and component types may also be used. In each of the embodiments described above, the search set was limited based on user inputs to provide a subset of the document space to the semantic engine for sematic searching. One possible example of a method of providing semantic search results is described below with respect to FIG. 5.

Figure 5:
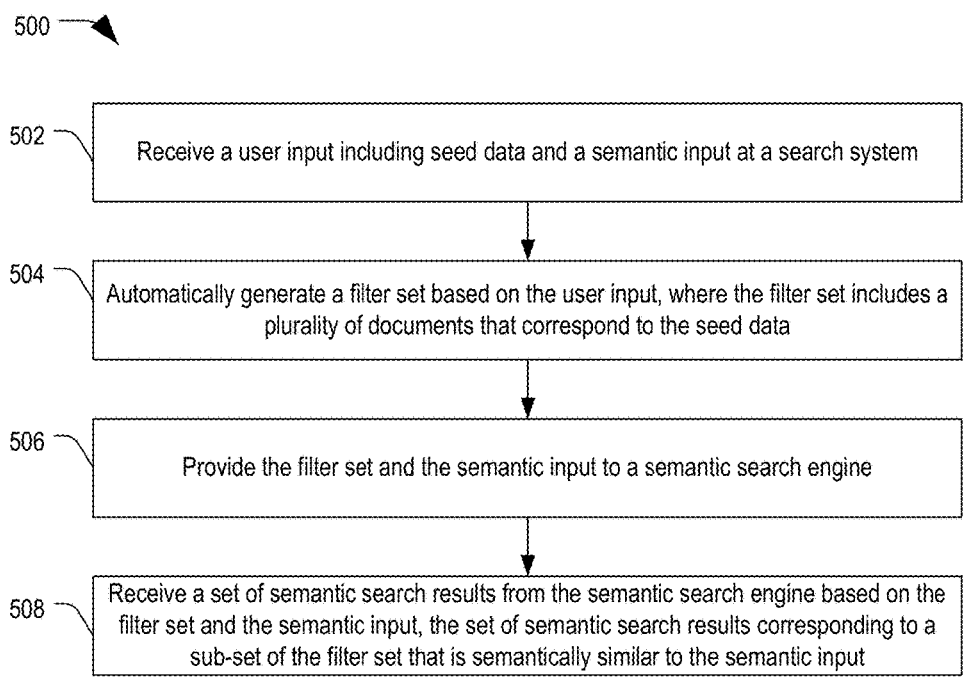
FIG. 5 is a diagram of a method of providing semantic search results according to an embodiment.

FIG. 5 is a diagram of a method 500 of providing semantic search results according to an embodiment. At 502, a user input is received at a search system from a user device, where the user input includes seed data and a semantic input. In an embodiment, the search system provides a graphical user interface including a plurality of user-selectable elements accessible by a user to select a searchable attribute and including text inputs for receiving the seed data and the semantic input. The graphical user interface further includes a selectable button accessible by the user to submit the user input, and the user input is received in response to user selection of the selectable button.

Advancing to 504, a filter set is automatically generated based on the user input. The filter set includes a plurality of documents that correspond to the seed data. In an example, automatically generating the filter set includes searching the searchable attribute of one or more data sources using the seed data to retrieve a set of documents defining the filter set. In an embodiment, the seed data includes a list of documents, and the filter set includes a set of document data pre-computed from the list of documents.

Continuing to 506, method 500 includes providing the filter set and the semantic input to a semantic search engine. The filter set and semantic input may be bundled into a transmission packet or may be stored in a memory accessible to the semantic search engine. In an embodiment, the semantic search engine searches within the filter set using the semantic input to find the set of semantic search results without rebuilding a semantic index. In a particular example, the seed data may include a set of products (or product identifiers), and the semantic search engine searches within the set of products to find the set of semantic search results without rebuilding a semantic index.

Proceeding to 508, a set of semantic search results is received from the semantic search engine based on the filter set and the semantic input. The set of semantic search results corresponds to a sub-set of the filter set that is semantically similar to the semantic input. In an embodiment, method 500 may further include generating a graphical user interface including the set of semantic search results and including at least one user-selectable element accessible by the user to switch from a first visualization of the set of semantic search results to a second visualization of the set of semantic search results. In another embodiment, method 500 may further include extracting data from at least one of the user input and the set of semantic search results and searching at least one data source using the extracted data to retrieve ancillary search results. The method may also include correlating the ancillary search results with the set of semantic search results to produce an output data set and providing a graphical user interface that includes the output data set to the user device.

While the above-identified example assumes seed data, it is possible to present different user-selectable elements based on the pre-defined category or attribute selected by the user. For example, the user may select the project radio button 306 in FIGS. 3 and 4, causing the GUI to present different input options as described below with respect to FIG. 6.

Figure 6:
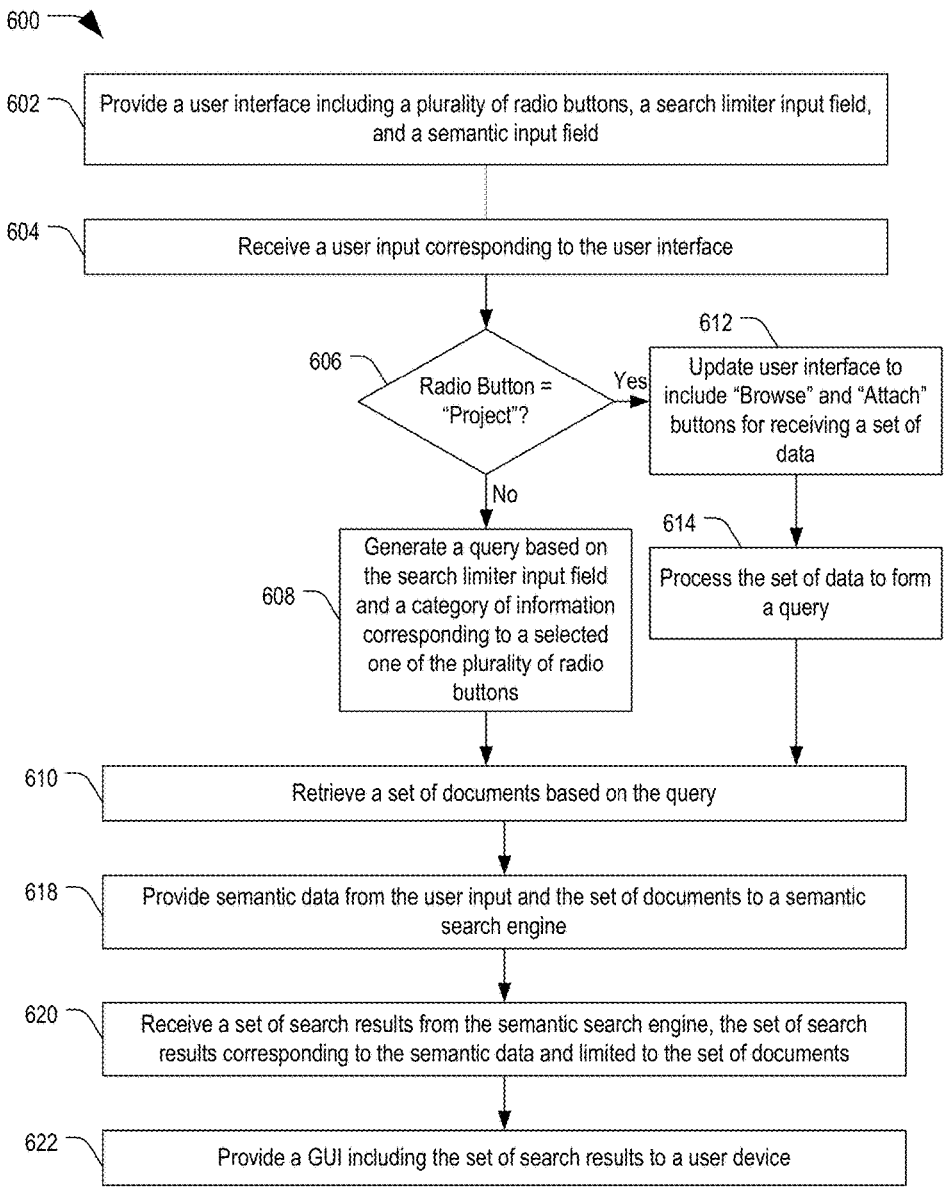
FIG. 6 is a diagram of a method of providing semantic search results according to a second embodiment.

FIG. 6 is a diagram of a method 600 of providing semantic search results according to a second embodiment. At 602, a user interface is provided that includes a plurality of radio buttons, a search limiter input field, and a semantic input field. The plurality of radio buttons may be replaced with a click link, tab, or other user-selectable element.

Advancing to 604, a user input is received that corresponds to the user interface. In an example, the user may select one of the plurality of radio buttons, where each radio button corresponds to a predetermined (predefined) attribute of documents in the document space, such as company name, individual name, and so on. At 606, if the radio button selection is not equal to "Project", method 600 advances to 608 and search system 102 generates a query based on the search limiter input field and a category of information corresponding to the selected one of the plurality of radio buttons 608. Continuing to 610, method 600 retrieves a set of documents based on the query.

Alternatively, at 606, if the radio button selection is equal to "Project", method 600 advances to 612 and the user interface is updated to include a browse button and an attach button for user-uploading of a set of data. In an example, the user may browse to a stored file and attach the file for processing. The file may be a text file, a comma-delimited file, or other file in a suitable format. Alternatively (or in addition), the GUI may be updated to include a drop-down menu accessible by the user to select a pre-defined search set or set of documents. Advancing to 614, the set of data is processed to form a query. Proceeding to 610, the set of documents are retrieved based on the query.

Moving to 618, semantic data from the user input and the set of documents are provided to a semantic search engine. Continuing to 620, a set of semantic search results is received from the semantic search engine, where the set of search results corresponds to the semantic data and is limited to the set of documents. Advancing to 622, a GUI is provided to a user device that includes the set of search results.

In an embodiment, the semantic search results may be augmented or supplemented with ancillary data, which may be retrieved by search system 102 and correlated to the semantic search results. In an example, corporate financial information may be correlated and linked to corporate names within the semantic search results. In another example, litigation data may be correlated and linked to corporate names within the semantic search results. The resulting augmented data may be included within the GUI send to the user device.

In accordance with various embodiments, the methods described herein may be implemented as one or more processor-readable instruction sets executing on a processor. Further, search system 102 and semantic search engine 110 may be implemented on a single computing system or may be distributed across two or more devices, depending on the implementation. The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description.

Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method for semantic searching comprises:
providing a graphical user interface from a search system to a computing device through a network, the graphical user interface including a plurality of user-selectable elements accessible by a user to provide user input, the plurality of user-selectable elements including a searchable attribute and including text inputs;
receiving the user input including seed data and a semantic input at the search system from the computing device;
in response to receiving the user input, automatically searching one or more data sources based on the seed data to identify a plurality of documents corresponding to the seed data to produce a filter set, the filter set including data corresponding to the user input;
automatically providing the filter set and the semantic input to a semantic search engine;
receiving a set of semantic search results from the semantic search engine based on the filter set and the semantic input, the set of semantic search results corresponding to a sub-set of the filter set that is semantically similar to the semantic input;
extracting data from the set of semantic search results;
searching the one or more data sources using the extracted data to retrieve ancillary search results;
correlating the ancillary search results with the set of semantic search results to produce an output data set; and
sending a search results interface to the computing device through the network, the search results interface including a plurality of user-selectable elements and including data related to the set of semantic search results and the output data set.

2. The method of claim 1, wherein receiving the user input including the seed data and the semantic input comprises receiving the user input in response to user selection of a selectable button of the plurality of user-selectable elements of the graphical user interface.

3. The method of claim 2, wherein automatically generating the filter set comprises searching the searchable attribute of one or more data sources using the seed data to retrieve a set of documents defining the filter set.

4. The method of claim 1, wherein the seed data comprises at least one of a date range, a company name, a revenue range, a number of employees, and an industry code.

5. The method of claim 1, wherein the seed data comprises a list of documents; and wherein the filter set comprises a set of document data pre-computed from the list of documents.

6. The method of claim 1, wherein at least one user-selectable element of the plurality of user-selectable elements of the search results interface accessible by the user to switch from a first visualization of the set of semantic search results to a second visualization of the set of semantic search results.

7. The method of claim 1, wherein the semantic search engine searches within the filter set using the semantic input to find the set of semantic search results without rebuilding a semantic index.

8. The method of claim 1, wherein:
the seed data comprises a set of products; and
the semantic search engine searches within the set of products to find the set of semantic search results without rebuilding a semantic index.

9. A search system comprising:
a network interface configured to communicate with a remote device through a network;
a processor coupled to the network interface; and
a memory coupled to the processor and configured to store instructions that, when executed, cause the processor to:
receive a user input including seed data, a search attribute, and a semantic input;
automatically search one or more data sources based on at least one of the seed data and the search attribute to generate a filter set including a plurality of documents;
automatically provide the filter set and the semantic input to a semantic search engine;
receive semantic search results from the semantic search engine that correspond to a subset of the filter set and that are semantically similar to the semantic input
automatically determine ancillary data based on data extracted from the semantic search results; and
provide a results interface including the semantic search results and the ancillary data to the remote device.

10. The search system of claim 9, wherein the memory further includes instructions that, when executed, cause the processor to:
correlate the search results to a set of ancillary data from the determined ancillary data to produce output data; and
provide the output data to the remote device within the results interface.

11. The search system of claim 9, wherein the memory further includes instructions that, when executed, cause the processor to provide a user search interface including at least one user-selectable element to select a predetermined attribute and including an associated text input to receive the seed data.

12. The search system of claim 9, wherein the predetermined attribute comprises a corporate name field and wherein the seed data comprises a company name.

13. The search system of claim 9, wherein the memory further includes instructions that, when executed, cause the processor to provide a search interface including at least one user-selectable element accessible by a user to select a predetermined document set that represents the seed data.

14. The search system of claim 9, wherein the memory further includes instructions that, when executed, cause the processor to provide a search interface including at least one user-selectable element accessible by a user to browse to a file and to attach the file to provide the seed data.

15. The search system of claim 9, wherein the filter set comprises a set of documents corresponding to a patent portfolio of a company.

16. The search system of claim 9, wherein the seed data comprises at least one of a list of identifiers associated with documents, a company name, a date range, a revenue range, a number of employees, and an industry code.

17. The system of claim 9, wherein the semantic search engine searches within a subset of a document space corresponding to the filter set without rebuilding a semantic index.

18. A search system comprising:
a semantic search engine configured to search a document space based on a semantic input to identify semantic search results having a semantic similarity to the semantic input; and
a search interface coupled to the semantic search engine, the search interface configured to:
  receive a user input from a computing device through a network, the user input including seed data, a search attribute, and a semantic input;
  retrieve a plurality of documents based on the seed data and the search attribute;
  automatically generate a filter set including data corresponding to the plurality of documents;
  automatically provide the filter set and the semantic input to the semantic search engine;
  receive the semantic search results from the semantic search engine, the semantic search results comprising a subset of the filter set;
  extract data from the semantic search results;
  search the one or more data sources using the extracted data to retrieve ancillary search results;
  correlate the ancillary search results with the semantic search results to produce an output data set; and
  provide a graphical user interface to the computing device, the graphical user interface including data related to the output data set and including a plurality of user-selectable elements accessible by a user to interact with the data.

19. The search system of claim 18, wherein the search interface is configured to provide a user search interface to the computing device through a network, the user search interface including at least one user-selectable element accessible by a user to select a predetermined attribute, an associated text input to receive the seed data, and a text input to receive the semantic input.

\* \* \* \* \*